United States Patent [19]
Okuchi

[11] Patent Number: 5,574,328
[45] Date of Patent: Nov. 12, 1996

[54] LIGHT SOURCE APPARATUS

[75] Inventor: Hiroaki Okuchi, Anjo, Japan

[73] Assignee: Nippondenso Co., Ltd, Kariya, Japan

[21] Appl. No.: 354,722

[22] Filed: Dec. 6, 1994

[30] Foreign Application Priority Data

Dec. 7, 1993 [JP] Japan ................... 5-306830

[51] Int. Cl.$^6$ ................ F21V 7/00; F21V 7/12
[52] U.S. Cl. ............. 313/114; 313/113; 313/111; 362/263; 362/298; 362/299
[58] Field of Search ................... 313/113, 114, 313/111; 362/32, 263, 298, 299, 300

[56] References Cited

U.S. PATENT DOCUMENTS

| | | | |
|---|---|---|---|
| 4,241,382 | 12/1980 | Daniel | 362/300 |
| 4,460,939 | 7/1984 | Murkami et al. | 362/300 |
| 5,021,928 | 6/1991 | Daniel | 362/32 |
| 5,099,168 | 3/1992 | Holten | 313/113 |
| 5,469,337 | 11/1995 | Cassarly | 362/32 |

FOREIGN PATENT DOCUMENTS

| | | |
|---|---|---|
| 0 623 780 A2 | 11/1994 | European Pat. Off. |
| 4-43379 | 7/1992 | Japan . |
| 4367835 | 12/1992 | Japan . |
| 5-47201 | 2/1993 | Japan . |

*Primary Examiner*—Nimeshkumar Patel
*Attorney, Agent, or Firm*—Cushman Darby & Cushman, L.L.P.

[57] ABSTRACT

An automobile headlamp apparatus comprising a direct current driven discharge lamp surrounded by a concave main mirror which confronts a concave spheroidal sub mirror. The main mirror has a first focus point located substantially at a center of a discharge gap of the discharge lamp between the cathode and anode thereof, while the sub mirror has first and second focus points and an opening therein around the optical axis of the sub mirror. The first and second focus points of the sub mirror are arranged to be substantially on the tips of the cathode and anode of the discharge lamp, respectively. A convex lens may be included to condense the light from the main mirror, wherein the main mirror has a second focus point at a focus point of the convex lens. A shade forming a favorable illumination pattern may be included. In one embodiment, a diagonal mirror is inserted between the main mirror and the convex lens to bend the light from the discharge lamp. An optical light guide may be provided between the diagonal mirror and the convex lens, and/or the discharge tube may be attached to a completed assembly of the main mirror and sub-mirror.

14 Claims, 4 Drawing Sheets

LIGHT SOURCE APPARATUS

BACKGROUND OF THE INVENTION

1. Field of the Invention

This invention relates to a light source apparatus and particularly to a light source apparatus for a head lamp unit of a vehicle or various projectors.

2. Description of the Prior Art

A conventional light source apparatus comprises a discharge lamp for emitting light and a concave mirror for reflecting the light from the discharge lamp. A discharge lamp, such as a metal halide lamp, is generally driven by an ac current. However, in the ac-driven method of the discharge lamp, a frequency of the alternating drive current is limited because an arc developed in the discharge lamp tends to be astable due to an acoustic resonance phenomenon. Further, an ac drive circuit for the discharge lamp is complicated and expensive. Therefore, light source apparatus having a dc drive circuit for driving a discharge lamp have been developed recently.

On the other hand, if a discharge lamp is driven by a direct current, metal gas ions are attracted by a negative electrode and a density of ions decrease on the positive electrode side, so that the discharge lamp emits reddish light on the negative electrode side and bluish light on the positive electrode side. That is, there is a problem in color separation of the emitting light.

In consideration of this, a prior art illumination optical apparatus reducing the color separation was developed and is disclosed in Japanese patent application provisional publication No. 4-367835. In this prior art apparatus, a concave mirror made of glass is provided behind a discharge lamp. The concave mirror has a red reflection film for reflecting red light and transmitting blue-green light on the inner surface thereof and a blue-green reflection film for reflecting blue-green light formed on the outer surface thereof. The red reflection film reflects the red light from the discharge lamp and transmits blue-green light and the blue-green reflection film reflects the blue-green light transmitted through the red reflection film. These reflection films reflect and combine red light and the blue-green light together to emit white light.

However, in this prior art illumination optical apparatus, there is a problem in that the production process forming these reflection films, each comprising multi-layer of deposited films, is complicated and expensive.

SUMMARY OF THE INVENTION

The aim of the present invention is to provide an improved light source apparatus.

According to the present invention there is provided a light source apparatus comprising: a main concave mirror having a first focus point on a first optical axis thereof. A discharge lamp has a cathode electrode, an anode electrode, and a discharge gap between the cathode and anode electrodes. A center of the discharge lamp is arranged substantially on the first focus point. A concave spheroidal mirror has second and third focus points on a second optical axis thereof and an opening therein around the second optical axis. An arranging structure arranges the main concave mirror and the concave spheroidal mirror such that a concave spheroidal mirror confronts the main concave mirror with the first optical axis arranged on the second optical axis and the second and third focus points are substantially arranged on tips of cathode and anode electrodes respectively.

The light source apparatus mentioned above may further comprise a convex lens, having a third optical axis arranged on the first and second optical axes, for condensing light from the discharge lamp via the main concave mirror, wherein the main mirror has a spheriodal mirror further having a fourth focus point and the convex lens having a fifth focus point on a third optical axis thereof, the fourth focus point being arranged on the fifth focus point.

The light source apparatus mentioned above may further comprise a direct current source having a positive output terminal connected to the anode electrode and a negative output terminal connected to the cathode electrode.

The light source apparatus mentioned above may further comprise a shade extending in the perpendicular direction to the first optical axis and arranged so as to stop a substantially half of a light beam generated by the discharge lamp via the main concave mirror.

The light source apparatus mentioned above may further comprise a diagonal mirror arranged on the first and second optical axes for reflecting light generated by the discharge lamp via the main mirror vertically. Moreover, a convex lens, having a third optical axis agreeing with a fourth optical axis defined by the diagonal mirror and the first and second optical axes, condenses light from the discharge lamp via the main concave mirror and the diagonal mirror and may be provided between the main mirror and the convex lens. Further, a light guide having an inlet receiving the light from the diagonal mirror and an outlet having a third optical axis may be provided between the diagonal mirror and the convex lens.

The light source apparatus having the structure mentioned above is turned on by connecting the discharge lamp to a dc supply source. The discharge lamp emits red light from a neighbourhood around the tip of the cathode electrode and blue-green light from a neighbourhood around the tip of the anode electrode because the discharge lamp is driven by a direct current, so that metal gas ions are attracted by the cathode electrode and are thinner on the side of the anode electrode. Therefore, color separation in the emitted light occurs.

However, this color separation is reduced as follows:

The second and third focus points of the concave spheroidal mirror are arranged on the tip (neighbourhood of the tip) of the cathode electrode and the tip (neighbourhood of the tip) of the anode electrode respectively. In the spheroidal mirror, light passing through one focus point of the mirror will focus at the other focus point after reflection by the spheroidal mirror. Therefore, the light emitted from the neighbourhood of the cathode electrode 4 is reflected by the spheroidal mirror and focused at the neighbourhood of the tip of the anode electrode and the light emitted from the neighbourhood around the anode electrode is reflected by the spheroidal mirror and focused at the neighbourhood of the tip of the cathode electrode. Accordingly, the red light and blue-green light emitted at neighborhoods of the cathode and the anode electrodes are favorably mixed, so that white light is provided there. The white light from the neighborhoods of the tips of the cathode and anode electrodes are reflected by the main concave mirror and projected in the forward direction from the opening of the spheroidal mirror with the color separation suppressed.

As mentioned, the light source apparatus of this invention can be manufactured at a low cost with the color separation suppressed by only providing the spheroidal mirror having the opening in front of the main concave mirror having a discharge lamp wherein the discharge gap of the discharge lamp 1 agrees is arranged on the focus point thereof. Moreover, almost all light beams emitted by the discharge lamp are projected in the forward direction with the almost all light beams converged at a high efficiency, so that a large amount of light is provided.

In this embodiment, the main concave mirror uses a spheroidal reflection mirror. However, other non-spherical concave mirrors such as a parabolic mirror or spherical concave mirrors can be used instead.

According to this invention, there is also provided a light source apparatus comprising: a main concave mirror having a first focus point on a first optical axis thereof and a first opening therein around the first optical axis. A concave spheroidal mirror, has second and third focus points on a second optical axis thereof and a second opening therein around the second optical axis. An arranging structure arranges the main concave mirror and spheroidal mirror such that the concave spheroidal mirror confronts the main concave mirror with the first optical axis arranged on the second optical axis and the second and third focus points are substantially arranged respectively on tips of cathode and anode electrodes of a discharge lamp to be provided inside the main concave mirror using the first opening. The first focus point is arranged on a middle of the second and third focus point approximately. In this apparatus, the discharge tube will be attached to the main concave mirror using the first opening.

BRIEF DESCRIPTION OF THE DRAWINGS

The objects and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
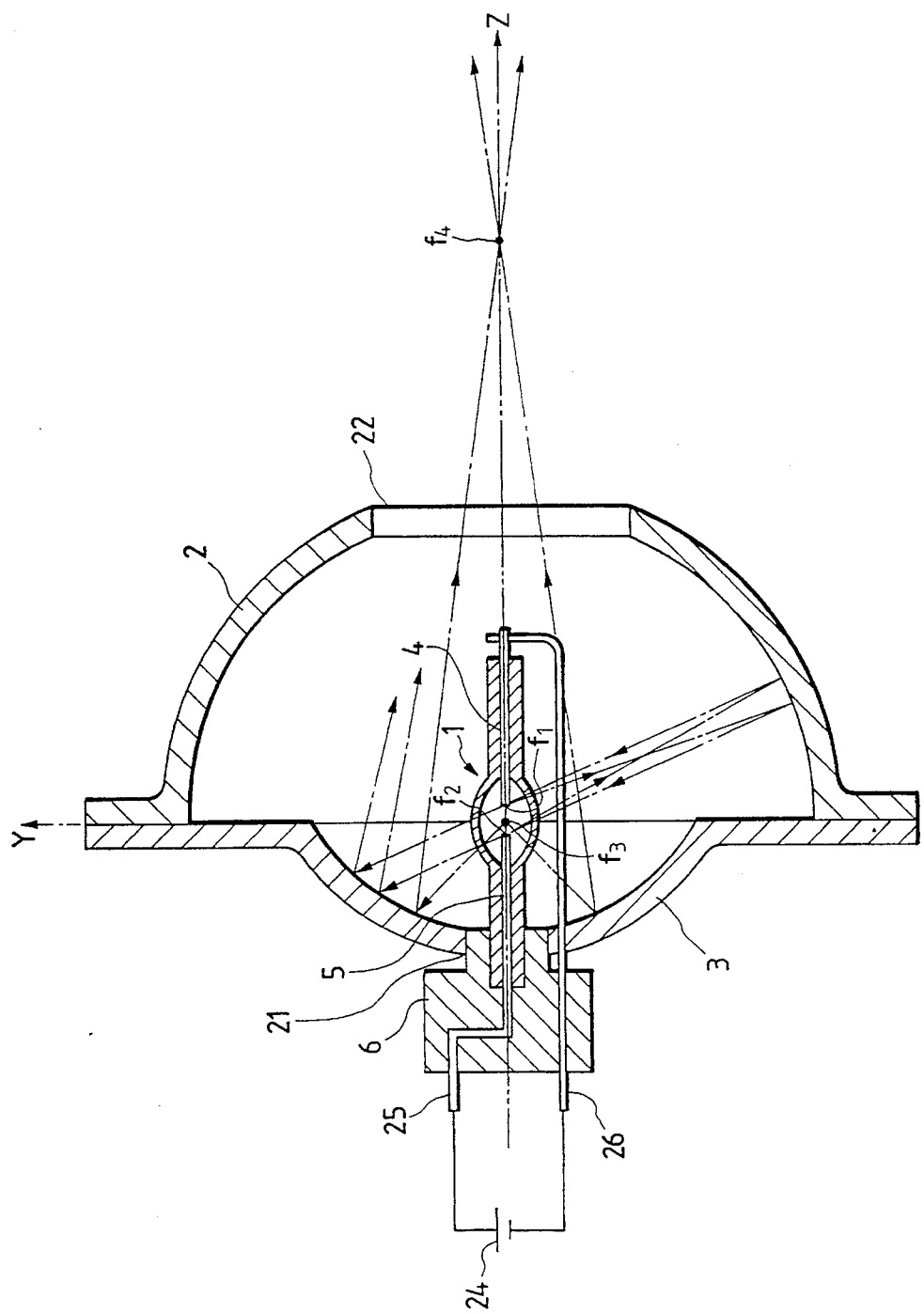
FIG. 1 is a cross-sectional view of a first embodiment of a light source apparatus.

Hereinbelow will be described a first embodiment of this invention. FIG. 1 is a cross-sectional view of the first embodiment of a light source apparatus.

A discharge lamp 1, such as a metal halide lamp, has a center arranged on one focus point f3 of a concave main mirror 3 having a first spheroidal reflection surface at the inner surface of the main mirror 3.

The first spheroidal reflection surface of the main mirror 3 is such that an ellipsoid is rotated around its optical (major) axis (Z axis shown in FIG. 1) and the main mirror 3 is formed by molding a plastic to have a predetermined shape having the spheroidal surface and depositing a reflection film at the inner surface of the molded plastic. The main mirror 3 has a first opening 21 therein around the optical (major) axis thereof.

The discharge lamp 1 has a tube, a cathode electrode 4 and anode electrode 5 with a discharge gap therebetween arranged in a line in the tube, and a terminal block 6 supporting the tube and cathode and anode leads connected to the cathode electrode 4 and the anode electrode 5 respectively wherein the discharge lamp 1 is fixed to the main mirror 3 at the middle of the main concave mirror 3 by fitting a portion of the terminal block 6 to the first opening 21.

A concave sub-mirror 2 has a second spheroidal reflection surface at the inner surface of the sub-mirror 2. The second spheroidal reflection surface of the sub-mirror 2 is such that a second ellipsoid is rotated around its major axis (Z axis shown in FIG. 1) and the sub-mirror 2 is formed by molding a plastic to have a predetermined shape having the second spheroidal surface and depositing a reflection film at the inner surface of the molded plastic.

The sub-mirror 2 has focus points f1 and f2 arranged such that focus point f1 is arranged approximately on a tip of the cathode electrode 4 and the focus point f2 is arranged approximately on a tip of the anode electrode 5.

That is, the light source apparatus comprises: a concave main mirror 3 having a first spheroidal reflection surface at the inner surface thereof having focus point f3 and focus point f4 on the optical axis Z thereof, and an opening 21 around the optical axis Z thereof. A discharge lamp 1 including cathode and anode electrodes 4 and 5 with a discharge gap therebetween is arranged on the focus point f3. The terminal block 6 supports cathode and anode terminal leads 25 and 26 and the tube. The discharge gap extends along the optical axis Z of the main mirror 3. The discharge lamp being fixed to the main mirror 3 through the terminal block 6 and the opening 21 of the main mirror 3 such that a center of the discharge gap is arranged on the focus point f3. A sub-mirror Z has a second spheroidal reflection surface at the inner (hollow) surface thereof having the focus point f1 and Focus point f2 on the optical axis Z thereof and the opening 21 around the optical axis Z thereof. The first spheroidal reflection surface confronts the second spheroidal reflection surface.

This light source apparatus having the structure mentioned above is turned on by connecting the discharge lamp 1 to a dc supply source. The discharge lamp 1 emits red light from a neighbourhood around the tip of the cathode electrode 4 and blue-green light from a neighbourhood around the tip of the anode electrode 5 because the discharge lamp 1 is driven by a direct current from a dc power supply 24, so that metal gas ions are attracted by the cathode electrode 4 and are thinner on the side of the anode electrode 5. Therefore, color separation in the emitted light occurs.

However, this color separation is reduced as follows:

The focus points f1 and f2 of the sub-mirror 2 are arranged on the neighbourhood of the tip of the cathode electrode 4 and the neighbourhood of the tip of the anode electrode 5 respectively. In the spheroidal mirror, light passing through one focus point of the spheroidal mirror will focus at the other focus point after reflection by the mirror. Therefore, the light emitted from the neighbourhood of the cathode electrode 4 is reflected by the sub-mirror 2 and focused at the neighbourhood of the tip of the anode electrode 5 and the light emitted from the neighbourhood around the anode electrode 5 is reflected by the sub-mirror 2 and focused at the neighbourhood of the tip of the cathode electrode 4. Accordingly, the red light and blue-green light emitted at neighborhoods of the cathode electrode 4 and the anode electrode 5 are favorably mixed, so that white light is provided there. The white light from the neighborhoods of the tips of the cathode and anode electrodes 4 and 5 are reflected by the main mirror 3 and projected in the forward direction from the second opening 22 with the color separation suppressed.

As mentioned, the light source apparatus of this embodiment can be manufactured at a low cost with the color separation suppressed by only providing the sub-mirror 2 having the opening 22 in Front of the main mirror 3 having a discharge lamp 1 wherein the discharge gap of the discharge lamp 1 is arranged on the focus point f3. Moreover, almost all light beams emitted by the discharge lamp 1 are projected in the forward direction and converged with high efficiency, so that a large amount of light is provided.

In this embodiment, the main mirror 3 uses the spheroidal reflection mirror. However, other non-spherical concave mirrors such as a parabolic mirror or spherical concave mirrors can be used instead.

Figure 2:
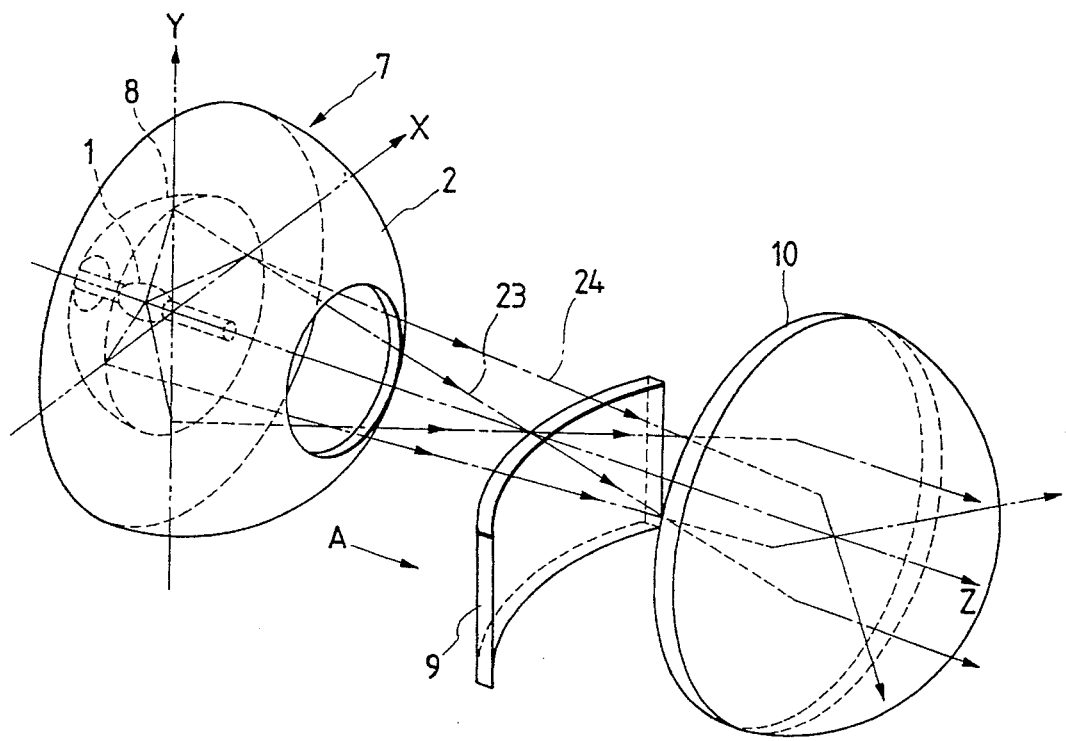
FIG. 2 is a perspective view of a second embodiment of a light source apparatus applicable to a head lamp unit of a vehicle.
Figure 3:
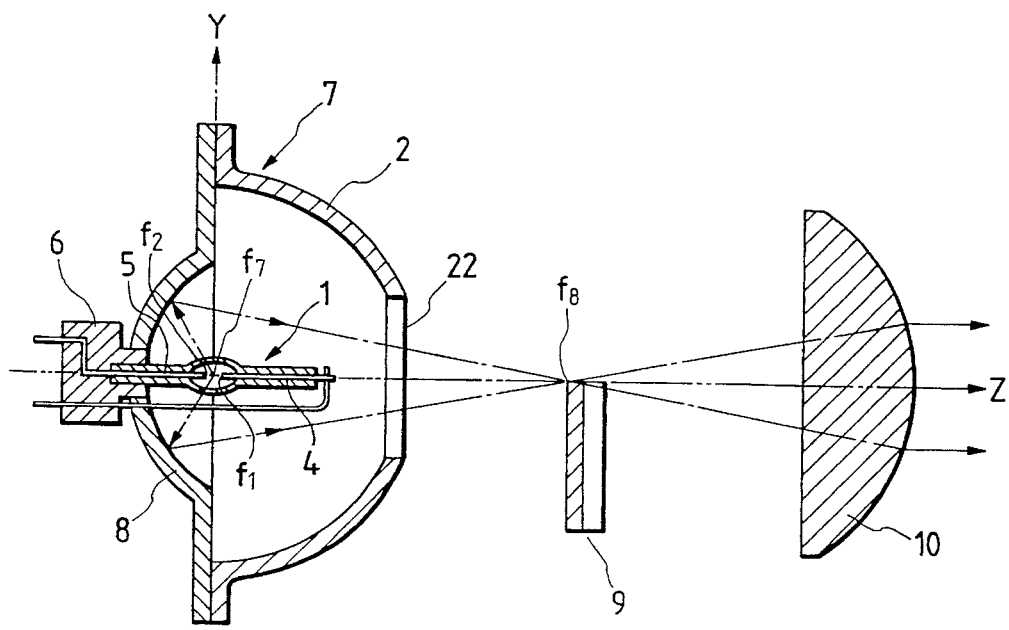
FIG. 3 is a front cross-sectional view of the second embodiment of the light source apparatus.
Figure 4:
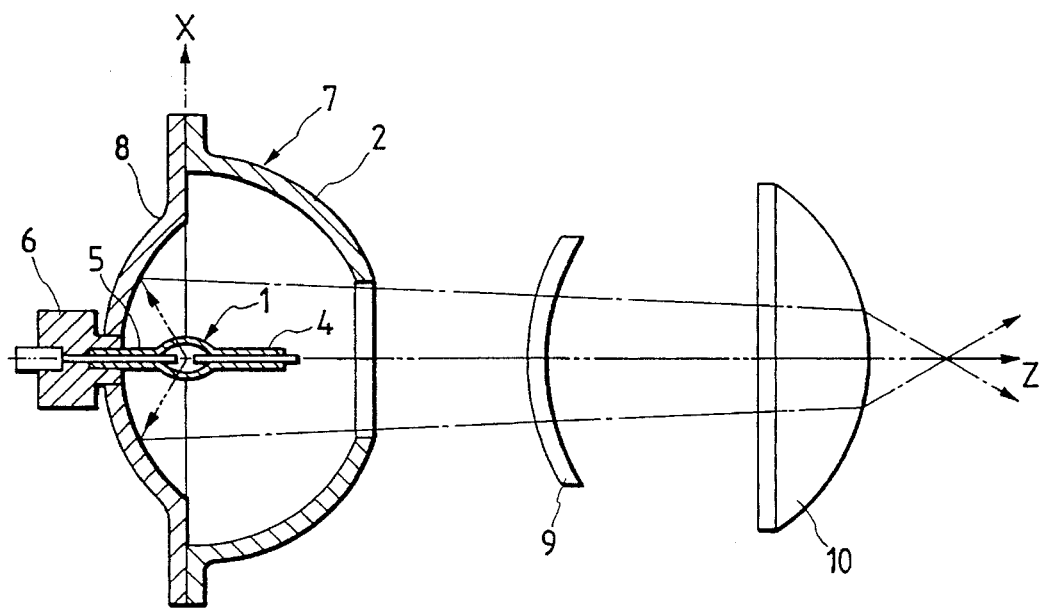
FIG. 4 is a plan view of the second embodiment of the light source apparatus wherein a partial cross-section is shown.
Figure 5:
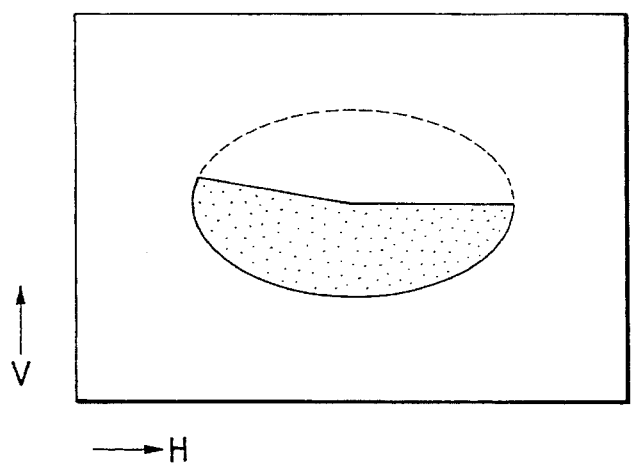
FIG. 5 is an illustration of the second embodiment of an illumination pattern in a vertical plane.
Figure 8:
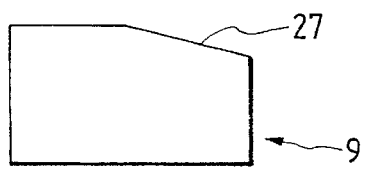
FIG. 8 is a partial view of the second embodiment illustrating the shade shown in FIG. 2 viewed from point A.

FIG. 2 is a perspective view of a second embodiment of a light source apparatus applicable to a head lamp unit of a vehicle wherein the same or corresponding elements or parts are designated with like references in FIG. 1, so that detailed descriptions for such elements are omitted. FIG. 3 is a front cross-sectional view of the second embodiment of the light source apparatus. FIG. 4 is a plan view of the second embodiment of the light source apparatus wherein a partial cross-section is shown. FIG. 5 is an illustration of the second embodiment of an illumination pattern in a vertical plane at a predetermined distance from the main mirror 3. FIG. 8 is a partial view of the second embodiment illustrating the shade shown in FIG. 2 viewed from point A.

In this light source apparatus 7 for a head lamp unit, the discharge lamp 1 is arranged approximately at a focus point of the concave main mirror 8 and the sub-mirror 2 has a spheroidal surface arranged to cover the front (the hollow side) of the main mirror 8.

The main mirror 8 is substantially an spheroidal mirror. That is, as shown in FIG. 3, in the Y-Z axis plane (vertical plane), the main mirror 8 acts as a spheroidal mirror having a near focus f7 at which a center of the discharge lamp 1 is located, and a far focus point f8. On the other hand, as shown in FIG. 4, a surface curve of the main mirror 8 in the X-Z axis plane (horizontal plane) is flatter than that in the Y-Z axis plane. That is, the curve in the X-Z axis plane locates the horizontal far focus point farther away from the main mirror 8 than the far focus point f8 but the near focus by the curve in the X-Z axis plane provides the same near focus point f7 as the focus point by the curve in the Y-Z plane. In other words, the main mirror 8 is seen as an ellipsoid when viewed from the front thereof. Therefore, a light beam 23 reflected by the main mirror 3 in the Y-Z plane and emitted through the opening 22 focuses at the focus point f8 but a light beam 24 reflected by the main mirror 8 in the X-Z plane and emitted through the opening 22 focuses at a farther point than the focus point f8.

In front of the light source apparatus 7, a shade 9 is provided at the far focus point f8 in the Z axis but under the Z axis and in front of the shade 9 (on the opposite side of the shade 9 from the main mirror 8), a convex lens 10 is provided. The convex lens 10 is arranged such that a focus point of the lens 10 is arranged approximately on the far focus point f8. The shade 9 cuts off an approximately lower portion of a beam emitted by the light source apparatus 7 to provide an illumination pattern favorable to a head lamp unit of a vehicle.

In this light source apparatus, when the discharge lamp 1 is turned on by a direct current, light generated at a neighbourhood of the tip of the cathode electrode 4 of the discharge lamp 1 is reflected by the sub-mirror 2 and directed to a neighbourhood of the tip of the anode electrode 5. On the other hand, light generated at a neighbourhood of the tip of the anode electrode 5 is reflected by the sub-mirror 2 and directed to a neighbourhood of the tip of the cathode electrode 4. Therefore, red light generated at the neighbourhood of the cathode electrode 4 and blue-green light generated at the neighbourhood of the anode electrode 5 are favorably mixed, so that white light is provided. Light returned to the neighborhoods of both electrodes 4, 5 (white light) is reflected by the main mirror 8 as it is. Therefore, a white light beam is emitted in the front direction of the main mirror 8 through the opening 22 of the sub-mirror 2 without color separation.

In the Y-Z plane, the light beam 23 emitted from the focus point f7 and reflected by the main mirror 8 is focused at the focus point f8 substantially completely. However, light beams emitted from neighborhoods around the focus point f7 along the Z axis are projected around the focus point f8 on a plane (not shown) in parallel to the X-Y plane, so that a distributed illumination pattern on this plane at the focus point f8 slightly spreads along the Y axis. The shade 9 located at the focus point f8 cuts off the light emitted through the opening 22 such that an approximately lower portion of the white light beam 23 at the focus point f8 is cut off. Moreover, as shown in FIG. 8, the shade 9 is cut to have a slope 27 on the right side thereof and the convex lens 10 projects the light beam cut by the shade 9 in the forward direction with the illumination pattern inverted. Therefore, the illumination pattern at a predetermined distance from this apparatus is such that an upper portion of an ellipsoid shape is cut but the left side edge of the cut ellipsoid shape is slightly extended upwardly as shown in FIG. 5 to provide an illumination pattern favorable to the head lamp unit of a vehicle.

Figure 6:
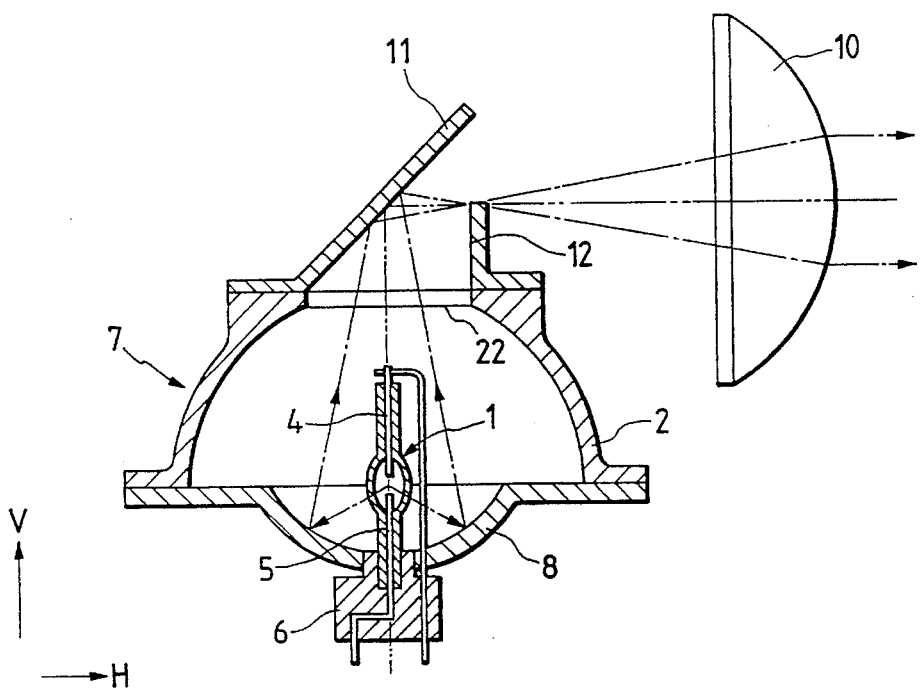
FIG. 6 is a front, partial cross-sectional view, of a third embodiment of a light source apparatus.

FIG. 6 is a front view, partial cross-sectional view, of a third embodiment of a light source apparatus.

There is a case where a discharge lamp provides a discharge more stable with a vertical position thereof than that with a particular horizontal position in accordance with a kind of a discharge lamp.

In such a case, the light source apparatus 7 is arranged in the vertical position and a reflection plane 11 is provided in front of the opening 22 of the sub-mirror 2 to bend the white beam approximately at a right angle to project the white beam in the horizontal direction H and the white beam is projected through the shade 12 and the convex lens 10 to provide an illumination pattern as shown in FIG. 5.

Figure 7:
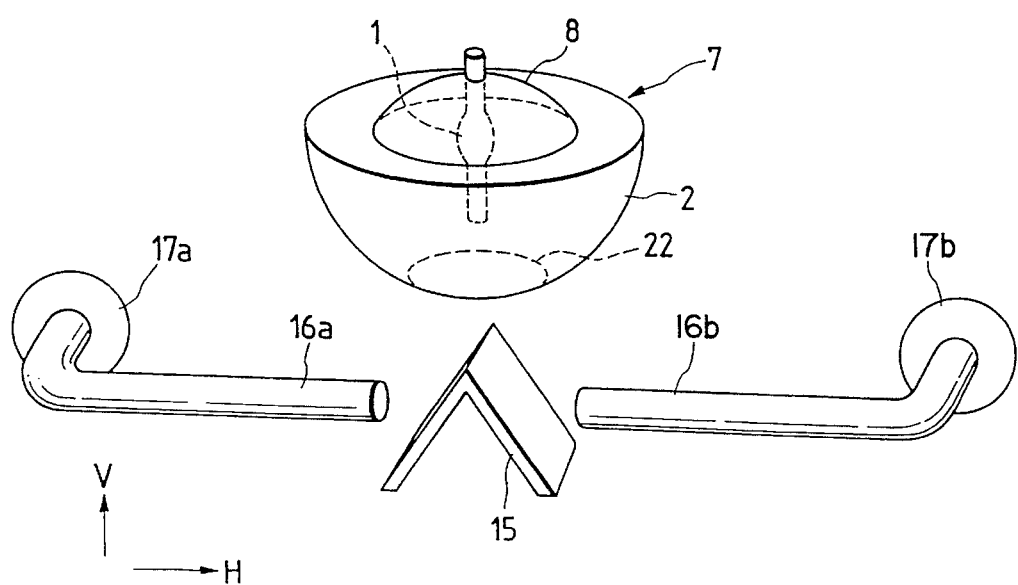
FIG. 7 is a perspective view of a fourth embodiment of an illumination according to the invention.

FIG. 7 is a perspective view of a fourth embodiment of an illumination apparatus wherein the illumination apparatus is applied to a head lamp unit of a central light source type. In the light source apparatus 7, the discharge lamp 1 is provided at the focus point of the main mirror 8. A sub-mirror 2 has a spheroidal mirror to provide a cover for the front (hollow surface) of the main mirror 8. A mirror assembly 15 has two diagonal mirrors arranged in a V-shape as viewed from the side thereof in the front of the opening 22 of the sub-mirror 2 so as to separate the white light beam emitted through the opening 22 in opposite horizontal directions. On both sides of the mirror assembly 15, inlets of fiber optics (optical fiber or light guide) 16a and 16b are arranged to receive these light beams from the mirror assembly 15, and at outputs of the fiber optics 16a and 16b, convex lenses 17a and 17b are provided respectively.

In this head lamp unit, the white beam projected through the opening 22 of the sub-mirror is divided into two beams in the horizontally opposite directions. These light beams are introduced into the inlets of the fiber optics 16a and 16b respectively and emitted at the outlets of the fiber optics 16a and 16b. The emitted light beams from the fiber optics 16a and 16b are projected by the convex lenses 17a and 17b in the front direction of the head lamp unit.

Similar to the First through third embodiments, in such a head lamp unit, when the discharge lamp 1 is turned on by a direct current, light generated at a neighbourhood of the tip of the cathode electrode 4 of the discharge lamp is reflected by the sub-mirror 2 and directed to the neighbourhood of the tip of the anode electrode 5. On the other hand, light generated at a neighbourhood of the tip of the anode electrode 5 is reflected by the sub-mirror 2 and directed to a neighbourhood of the tip of the cathode electrode 4. Therefore, red light generated at the neighbourhood of the cathode electrode 4 and blue-green light generated at the neighbourhood of the anode electrode 5 are favorably mixed, so that white light is provided. Light returned to the neighborhoods of both electrodes 4, 5 (white light) is reflected by the main mirror 8 as it is. Therefore, a white light beam is emitted in the front direction of the main mirror 8 through the opening 22 of the sub-mirror 2 without color separation.

Moreover, in the optical system using fiber optics, if a length of the fiber optic 16a, 16b is sufficiently long, color separated light beams are mixed during passing through the fiber optic, so that a white beam may be provided. However, if a length of the fiber optic is short, the color separation is not sufficiently suppressed, so that it is efficient to suppress the color separation in the light source apparatus 7.

In the above mentioned embodiments, the main mirror 3, 8 and the sub-mirror 2 may be assembled at one place and the discharge tube may be attached to the assembly at another place. Moreover, in accordance with the size of the discharge tube 1, the position of the discharge tube 1 may be adjusted by adjusting the dimension of the terminal block 6 such that the focus points f1 and f2 are arranged on the tips of the cathode and anode electrodes 4 and 5 respectively.

What is claimed is:

1. A light source apparatus comprising:

a concave main mirror having a first main mirror focus point on an optical axis of said concave main mirror;

a discharge lamp including:
        a cathode electrode,
        an anode electrode, and
        a discharge gap between said cathode electrode and said anode electrode,
        a center of said discharge lamp being located substantially at said first main mirror focus point; and a concave sub mirror having a first sub mirror focus point and a second sub mirror focus point on an optical axis of said concave sub mirror, said concave sub mirror having an opening therein around said optical axis of said Concave sub mirror;

said concave main mirror and said concave sub mirror confronting each other such that said optical axis of said concave main mirror is arranged on said optical axis of said concave sub mirror; and said first focus point of said concave sub mirror and said second focus point of said concave sub mirror are arranged to be substantially on tips of Said cathode electrode and said anode electrode, respectively.

2. A light source apparatus as claimed in claim 1, further comprising:

a convex lens having a convex lens optical axis, said convex lens optical axis being arranged on said optical axis of said concave main mirror and said optical axis of said concave sub mirror, and said convex lens condensing light reflected off said concave main mirror from said discharge lamp.

3. A light source apparatus as claimed in claim 1, further comprising:

a direct current source having a positive output terminal connected to said anode electrode of said discharge lamp and a negative output terminal connected to said cathode electrode of said discharge lamp.

4. A light source apparatus as claimed in claim 1, further comprising:

a convex lens having a convex lens focus point on an optical axis of said convex lens;

said concave main mirror comprising a mirror, a second focus point of said concave main mirror being arranged on said convex lens focus point; and said optical axis of said convex lens being arranged on said optical axis of said concave main mirror.

5. A light source apparatus as claimed in claim 1, further comprising:

a shade extending in a direction perpendicular to said optical axis of said concave main mirror and being arranged so as to stop substantially half of a light beam generated by said discharge lamp and reflected by said main concave mirror.

6. A light source apparatus as claimed in claim 1, further comprising:

a diagonal mirror arranged on said optical axis of said concave main mirror and said optical axis of said concave sub mirror, said diagonal mirror bending light generated by said discharge lamp and reflected by said concave main mirror.

7. A light source apparatus as claimed in claim 6, further comprising:

a convex lens having a convex lens optical axis, said convex lens optical axis being arranged on an optical axis of said diagonal mirror, said optical axis of said concave main mirror, and said optical axis of said concave sub mirror, and said convex lens condensing light reflected off said concave main mirror from said discharged lamp.

8. A light source apparatus as claimed in claim 6, further comprising:

a convex lens; and a light guide having an inlet receiving light reflected from said diagonal mirror, and having an outlet directed toward said convex lens;

said convex lens condensing light reflected from said concave main mirror from said discharge lamp.

9. A light source apparatus as claimed in claim 1, further comprising:

a mirror assembly including a first diagonal mirror and a second diagonal mirror arranged on said optical axis of said concave main mirror and said optical axis of said concave sub mirror, said mirror assembly separating a light beam generated by said discharge lamp and reflected by said main mirror into first and second light beams, said mirror assembly reflecting said first and second light beams in opposite directions.

10. A light source apparatus as claimed in claim 9, further comprising:

first and second light guides, each of said first and second light guides including an inlet, first and second convex lenses each having an optical axis, and an outlet directed respectively toward said first and second convex lenses;

said first and second Light guides condensing light from said discharge lamp and reflected by said concave main mirror.

11. A light source apparatus according to claim 1, wherein:

said concave sub mirror is a concave spheroidal sub mirror.

12. A light source apparatus comprising:

a concave main mirror having a first main mirror focus point on an optical axis of said concave main mirror, said concave main mirror having a first opening therein around said optical axis of said concave main mirror;

a discharge lamp located within said concave main mirror, said discharge lamp including an anode electrode and a cathode electrode;

a concave sub mirror having a first sub mirror focus point and a second sub mirror focus point on an optical axis of said concave sub mirror, said concave sub mirror having a second opening therein around said optical axis of said concave sub mirror; and said concave main mirror and said concave sub mirror confronting each other such that said optical axis of said concave main mirror is arranged on said optical axis of said concave sub mirror;

said first focus point of said concave sub mirror and said second focus point of said concave sub mirror being arranged to be substantially on tips of said cathode electrode and said anode electrode of said discharge lamp, respectively; and said first focus point of said concave main mirror being arranged on substantially a midpoint between said first focus point of said concave sub mirror and said second focus point of said concave sub mirror.

13. A light source apparatus comprising:

a first concave mirror having a main mirror focus point;

a second concave mirror confronting said first concave mirror, said second concave mirror having a central opening about an optical axis of said light source apparatus, said second concave mirror having a first focus point and a second focus point different from said first focus point, said first focus point and said second focus point both being located between said confronted first concave mirror and said second concave mirror; and a discharge lamp comprising:
an anode electrode,
a cathode electrode, and
a discharge gap between said anode electrode and said cathode electrode;

said discharge lamp being disposed within said confronted first concave mirror and said second concave mirror such that said discharge gap of said discharge lamp is located substantially at said focus point of said first concave mirror, said anode electrode is located substantially at said first focus point of said second concave mirror, and said cathode electrode is located substantially at said second focus point of said second concave mirror.

14. A light source apparatus as claimed in claim 13, wherein:

said anode electrode of said discharge lamp is oriented toward said first concave mirror and said cathode electrode of said discharge lamp is oriented toward said second concave mirror.

* * * * *